United States Patent [19]

Vyshkina et al.

[11] Patent Number: 5,967,965
[45] Date of Patent: Oct. 19, 1999

[54] METHOD FOR TREATING SOIL CONTAMINATED WITH HEAVY METALS

[75] Inventors: Tamara V Vyshkina, Brooklyn, N.Y.;
Mark Y. Kigel, East Brunswick, N.J.;
Mikhail Kofman, New York, N.Y.;
Gerard N. Pica, Jersey City, N.J.;
Peter J. Diglio, Glen Ridge, N.J.;
Salvador A. Riggi, Jersey City, N.J.

[73] Assignee: Envirem, East Brunswick, N.J.

[21] Appl. No.: 08/927,112

[22] Filed: Aug. 29, 1997

[51] Int. Cl.$^6$ .............................. A62D 3/00; B09C 1/02; B09C 1/08
[52] U.S. Cl. ........................... 588/256; 588/236; 134/13; 210/913; 405/128
[58] Field of Search .................................. 134/13, 28, 29; 210/912, 913; 405/128; 588/236, 256

[56] References Cited

U.S. PATENT DOCUMENTS

| | | |
|---|---|---|
| 4,005,009 | 1/1977 | Kinoshita et al. . |
| 4,338,134 | 7/1982 | Graf zu Münster . |
| 4,629,509 | 12/1986 | O'Hara et al. . |
| 4,744,829 | 5/1988 | Elrich et al. . |
| 4,943,377 | 7/1990 | Legare, III . |
| 5,128,068 | 7/1992 | Lahoda et al. ...................... 405/128 X |
| 5,205,939 | 4/1993 | Syrinek ............................... 210/912 X |
| 5,244,492 | 9/1993 | Cyr ...................................... 588/236 X |
| 5,302,287 | 4/1994 | Losack ................................ 210/912 X |
| 5,304,710 | 4/1994 | Kigel et al. . |
| 5,330,658 | 7/1994 | Grant et al. ......................... 210/913 X |
| 5,397,478 | 3/1995 | Pal et al. ............................. 588/256 X |
| 5,476,994 | 12/1995 | Trezek ..................................... 588/256 |
| 5,503,656 | 4/1996 | Hobby ................................. 588/236 X |
| 5,720,886 | 2/1998 | Iwinski ................................ 210/912 X |

OTHER PUBLICATIONS

Scientific Ecology Group, Technology Type: Soil Flushing, EPA Database VISITT, Mar. 3, 1993, 3 pages.
Davy Research and Development, Ltd., Technology Type: Chemical Treatment–Other, "In–Pulp Decon–tamination of Contaminated Soil", EPA Database VISITT, Feb. 12, 1993, 3 pages.
IT Corp., Technology Type:Acid Extraction, EPA Database VISITT, Mar. 10, 1993, 3 pages.
Cognis, Inc., Technology Type: Acid Extraction, TerraMet Heavy Metal Removal Technology, EPA Database VISITT, Feb. 11, 1993, 3 pages.

Primary Examiner—George Suchfield
Attorney, Agent, or Firm—Robert L. Stone

[57] ABSTRACT

A method for treating heavy metal contaminated soils, particularly those containing hexavalent chromium, which includes a first soil washing at pH 9–12 with an anionic synthetic organic flocculant followed by a liquid-solid phase separation such as by gravity separation including sedimentation, an optional second soil sludge washing at pH 2.5–3.0 with addition of a metal valency reducing agent which when done is followed by a second liquid-solid phase separation using a cationic synthetic organic flocculant, combining the first and second stage liquids and optional treating the liquid phase with a metal valency reduction agent such as sodium metabisulfite under acidic conditions followed by treatment with an alkaline agent to form insoluble metal hydroxide which is separated in a phase separation process and is combined with the final sludge, recycling the liquid from washing stage or stages for use in soil processing, dewatering the separated sludge or sludges using a separation method (e.g. pressure filtration, centrifuge, etc.) and treating the dewatered sludge with an alkaline reagent, such as dry lime dust, lime slurry, potassium or sodium hydroxide thus resulting in metal immobilization within the treated soil in the hydroxide form.

15 Claims, 1 Drawing Sheet

METHOD FOR TREATING SOIL CONTAMINATED WITH HEAVY METALS

FIELD OF THE PRESENT INVENTION

This invention relates to methods for treating solid wastes such as soil, silt, mud, earth, dirt, sludge, turf and municipal, industrial and/or agricultural solid wastes contaminated with heavy metals using a process of combined treatment of said wastes with an anionic flocculant, then, if necessary, with a valency reduction agent, and subsequent optional treatment with solution of a cationic synthetic organic flocculant. This method is an environmentally benign technology and is effective and efficient in the process of entrapping such impurities in the form of non-toxic stable solid material usable for backfilling, road construction subbase, landfill closing-up, etc.

BACKGROUND AND PRIOR ART

The methods for treating soils contaminated with heavy metals known to the skilled-in-the-art are based on either washing the soil with solutions which change metal valency and/or making metals insoluble or detoxifying and immobilizing the metals within the soil matrix.

The known soil washing methods suffer many drawbacks because a substantial portion of the heavy metals in the soil, particularly chromium, are bound with organic soil components and are difficult to release. Thus, heavy metals in the soil are typically bound with organic matter (e.g. humic acids) and sometimes are poorly extracted unless the organic compounds are destroyed. These complexes are unstable under acidic or alkaline conditions when hydrolysis of organic substances occurs. To fully extract heavy metals from the soil, it is usually necessary to add chemical reagents to lower pH to 2–3, wash the soil by 2–3 volumes of elutriate to ensure full metal recovery and then adjust pH to 7.0–7.5. This is a costly procedure for industrial use. Also, these methods usually require extensive use of expensive reagents, e.g. acids or alkali, etc.

There is a method for heavy metal contaminated soil treatment (the technology is filed in the United States Environmental Protection Agency database VISITT under vendor name IT Corp. Mar. 10, 1993). Heavy metal are extracted from the soil slurry by contact with hydrochloric acid which then is drawn-off, two-stage the water washing and final caustic wash. An important drawback of the method is foaming of the slurried soil.

Scientific Ecology Group, Inc. has developed a process for removing heavy metal contaminants from soil by using an extraction solution containing sufficient cations to displace the contaminant from soil (the technology is filed in the EPA database VISITT Mar. 31, 1993). The main disadvantage of the method is that soil has low permeability and thus is not substantially dewatered.

There is known a resin-in-pulp technology to extract metal contaminants (the technology is filed in the EPA database VISITT under the trade name "In-Pulp Decontamination of Contaminated Soil" Feb. 12, 1993). This technology uses an adsorbent such as ion exchange resin or active carbon to extract the dissolved metals. The shortcoming of the technology is the necessity to separate soil from pulp particles which is a very costly process. Also, the synthetic resins used for the process are very expensive.

There exists a technology registered in the EPA database VISITT under the trade name "TerraMet Heavy Metal Removal Technology" Feb. 11, 1993 which represents an extractive process which leaches heavy metals from contaminated soil with a proprietary aqueous leaching solution and subsequent metal ion removal using liquid ion exchange, resin ion exchange or reduction. The main disadvantage of the method is the presence of high levels of surfactants. Additionally, this method suffers several of the same drawbacks as the above discussed methods.

Further, known soil immobilization and cement encapsulation methods generally result in substantial increase of the treated soil volume.

U.S. Pat. No. 5,304,710 describes a method for treating chromium ore waste contaminated soils by detoxification, fixation, immobilization and, stabilization. The drawbacks of the method include its use of expensive ferrous sulfate and a substantial increase in treated soil volume caused by forming crystalhydrates in course of the fixation process.

U.S. Pat. No. 4,629,509 describes a method for treating cadmium and lead contaminated solid residue with calcium sulfide to reduce leaching of cadmium and lead from said residue to environmentally acceptable levels. A particularly convenient method involves addition of dry lime and an aqueous solution of an inorganic salt supplying sulfide, especially an alkali metal sulfide. The main disadvantage of the method is that the amount of reagent additives strongly depends on heavy metal content and it is impractical for heavy contaminated soils, while also being too complicated for use with lower concentration of metals.

U.S. Pat. No. 4,744,829 describes a process for production of agglomerates which are resistant to leaching out, from finely divided waste materials by dissolving a hydraulic binding agent under a condition of forced mixing, combining the resulting aqueous colloidal solution with finely divided waste materials, agglomerating by mixing, and then hardening. The main drawback of the method is that the agglomerates hardening is very slow under its conditions of low temperatures thus requiring additional heating which adds to the cost of the process.

U.S. Pat. No. 4,005,009 describes a method of treating waste water containing surfactants and heavy metals such as Cd, Cr, Mn, Hg, etc. by the flocculation process with a cationic macromolecular reagent at a dosage ranging from 1 to 50 ppm. The cationic macromolecular reagent for use in the method includes polyacrylamine as well as denatured substances thereof, polyimine, etc. to facilitate adsorption of the aggregate substance, surfactants and heavy metals by foams. The process of binding the heavy metals by this patent is based on chemical adsorption and is insufficiently effective for higher concentration of heavy metals. In particular, this method is impractical for removal of heavy metals contained in the soils where they are tightly bound with organic material.

U.S. Pat. No. 4,943,377 discloses a method for removal of dissolved heavy metals from waste oils, industrial wastewater, or polar solvent by metallic polythiocarbonate formation. This method when used for soil treatment requires substantial dilution which results in need for large volumes of the reactors and the use of a very high dosage of reagents.

For solidification of sludge or semi-liquid wastes, some polymeric materials may be added as a coagulation/cross-linking aid.

U.S. Pat. No. 4,338,134 describes a process for binding waste liquor or sludge, in which a hydraulic mortar is added and the mixture is subjected to a milling operation and then allowed to set. Optionally, from 0.5 to 20% by weight of a polymerisable resin such as a urea-formaldehyde or a melamine-formaldehyde or an acrylic resin are added. The drawback of the method is the high cost of the polymerisable resin and bulking of the final product.

The present invention provides a combination of washing and encapsulation techniques using solutions of anionic and when appropriate cationic synthetic organic flocculants which avoid the main drawbacks mentioned above. This allows one to minimize the use of reagents compared with the washing techniques, and does not result in the increase of treated soil volume compared with the known encapsulation methods.

SUMMARY OF THE INVENTION

This invention relates to a method for treating heavy metal contaminated soils, particularly those containing hexavalent chromium, which includes a soil washing at pH 9–12 with a solution of an anionic synthetic organic flocculant followed by a first liquid-solid phase separation such as by gravity separation including sedimentation, an optional second soil sludge washing at pH 2.5–3.0 with addition of a metal valency reducing agent which when done is followed by a second liquid-solid phase separation using a cationic synthetic organic flocculant, combining the first and second stage liquids and optimally treating the liquid phase with a metal valency reduction agent such as sodium metabisulfite under acidic conditions followed by treatment with an alkaline agent to form insoluble metal hydroxide which is separated in a phase separation process and is combined with the final sludge, recycling the liquid phase from the first and the second washing phases for use in soil processing, dewatering the separated sludge or sludges using a separation method (e.g. pressure filtration, centrifuge, etc.), treating the dewatered sludge with an alkaline reagent, such as dry lime dust, lime slurry, potassium or sodium hydroxide thus resulting in metal immobilization within the treated soil in the hydroxide form.

For the purposes of this invention heavy metals include such elements as antimony, bismuth, cadmium, chromium, copper, iron, lead, manganese, nickel, tin or zinc.

The reducing agents which can be used in the present invention include any kind of electron donor substance, such as sodium metabisulfite, a bivalent iron sulfur containing salt, e.g. ferrous sulfate. Sodium metabisulfite is preferred. When chromium is treated it is used in the range of about 0.01–1 mole equivalent based on initial chromium concentration in soil. A concentration of about 0.5 mole equivalent is preferred. If soil is contaminated with other heavy metals such as lead, cadmium, etc. the method of treatment may not require addition of a valency reducing agent.

An anionic synthetic organic flocculant, such as anionic polyacrylamide, polyethylene oxide or copolymer thereof, serves as a chelating agent for heavy metals, particularly for chromium, and removes it from the soil. It typically has high molecular weight such as above about 1 million. It is used in first stage washing to extract heavy metals to solution. The range of concentration is typically about 0.01–0.1% when chromium is treated. A concentration of about 0.05% is preferred.

When used, a cationic synthetic organic flocculant such as Mannich base polyacrylamide, polyacrylamine, polyacrylimine or copolymer thereof, serves as a flocculating agent for liquid-solid separation. It typically has a molecular weight below about 1 million. It interacts with negatively charged groups of organic matter in soil such as humic and fulvic acids and facilitates its precipitation. The range of concentration is typically about 0.01–0.1% when chromium is treated. A concentration of 0.05% is preferred.

Alkaline reagents which can be employed include dry lime dust, lime slurry, potassium or sodium hydroxides, etc. Lime is preferred. The range of concentration is typically about 0.5–5% by weight based on soil weight when chromium is treated. A concentration of about 1% is preferred.

The water insoluble compound which results from alkaline addition is an insoluble metal oxide, a hydrated oxide or a hydroxide. It is to be understood that such oxides, hydrated oxides and/or hydroxides (collectively referred to as oxides) can be complex in nature and their particular molecular structure is not important so long as they are substantially water insoluble. The principal advantage of this process is that it generally results in a lower density material compared with the known fixation or encapsulation techniques. Further, only small quantities of additives are required to solidify wastes.

BRIEF DESCRIPTION OF THE DRAWING

A schematic of the proposed soil treatment flow chart in accordance with aspects of the invention including optional techniques is shown in FIG. 1.

DETAILED DESCRIPTION OF THE INVENTION

Figure 1:
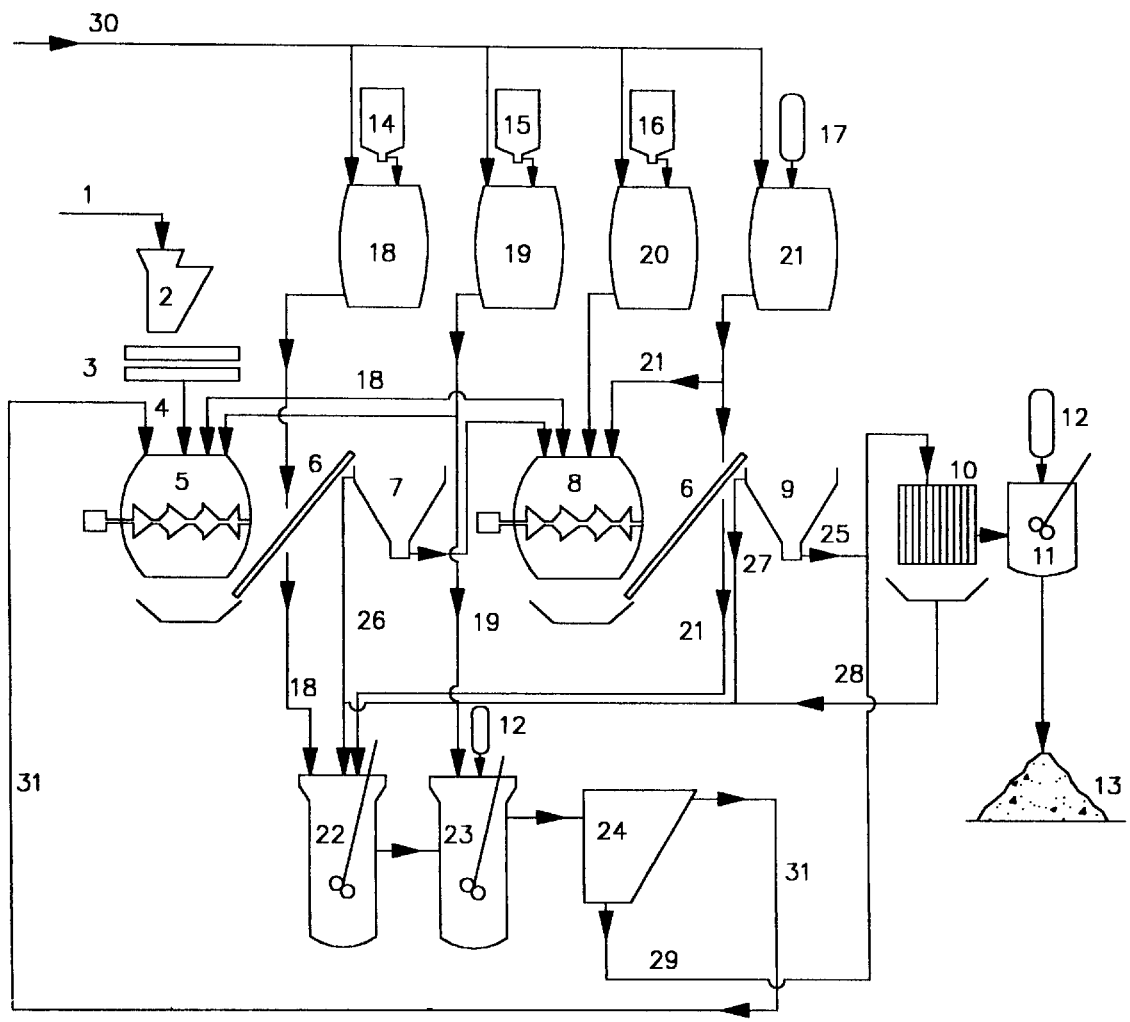

Heavy metal contaminated soil 1 is crushed in mill 2, sifted to 100 mesh 3, then conveyed by transportation means 4 to reactor 5 for treatment by washing with an admixture of diluted solution of anionic synthetic organic flocculant and sulfuric acid in order to maintain pH about 9.0–12.0. Emulsion of anionic synthetic organic flocculant 15 is conveyed to preparation and dosing unit 19, from which diluted solution of flocculant is conveyed to reactor 5 and to second stage liquid treatment unit 23. Sulfuric acid 14 is diluted by water 30 in preparation and dosing unit 18 and is conveyed to reactors 5 and 8, and first stage liquid treatment unit 22. When the contaminant is chromium, the pH should be maintained at about 12. Reactors 5 and 8 are equipped with mixing systems. The flocculant solution alone is used in reactor 5 if the pH does not exceed 12 during 1-hour mixing. Under alkaline conditions, soluble metal cations are extracted from organic matter and removed with the liquid phase.

Sludge is then conveyed by conveyer 6 to liquid-solid phase separation unit 7. The liquid phase 26 is drained off to the first stage liquid treatment unit 22, where 10–66% sulfuric acid solution is added to bring the pH to 2.5, and an electron donor agent, particularly sodium metabisulfite is added to change metal valency. Sodium metabisulfite 17 is diluted by water 30 in preparation and dosing unit 21 and conveyed to reactor 8 and liquid treatment unit 22. In the case of chromium, chromium is detoxified by reducing it from hexavalent to trivalent. Liquid from the first and the second phase separation stages, 22 and 23 respectively, is combined and alkaline reagent 12, particularly lime slurry, is added to bring the pH to 9.0 and to form insoluble heavy metal oxide or hydroxide which is precipitated and filtered in phase separation unit 24. Heavy metal hydroxide containing sludge 29 is combined with the second stage sludge 25. Liquid 31 is recycled in soil processing in reactor 5.

From phase separation unit 7 sludge is conveyed to reactor 8 for second washing where at high heavy metal concentration the soil sludge is additionally treated with sulfuric acid solution to bring the pH to 2.5 and an electron donor agent, particularly sodium metabisulfite is added as above followed by adding a diluted solution of a cationic flocculant during 0.2–1.5-hour mixing. Concentrated solution of cationic synthetic organic flocculant 16 is conveyed to preparation and dosing unit 20 in which it is diluted by water 30 and conveyed to reactor 8. After the second stage liquid-solid separation in phase separation unit 9 and sludge dewatering, liquids 27 and 28 are treated in the first stage liquid treatment unit 22. The sludge removed from the second stage of treatment is combined with the metal hydroxide containing sludge 29 and is dewatered either by pressure filtration or centrifuge 10, then treated with lime 12 in neutralization reactor 11 for metal immobilization in hydroxide form and disposed of either for construction use or for construction site backfill 13.

When the initial chromium concentration in the soil is light (e.g. up to about 100 ppm) a single wash with the solution of anionic synthetic organic flocculant is sufficient to decontaminate the soil. When the initial chromium concentration in the soil is moderate (e.g. from about 100 to 1000 ppm), two to three washes with the solution of anionic synthetic organic flocculant are sufficient to clean-up the soil. When the initial chromium concentration in the soil is high (e.g. more than about 1000 ppm) at least three washes with the solution of anionic synthetic organic flocculant are done followed by treatment with addition of electron donor agent under acidic conditions in order to fully decontaminate the soil. Those numbers are typical for chromium. As to our understanding, for other metals the ranges of light, moderate and heavy concentration could be different. Thus, soil treatment method modifications can depend upon heavy metal concentration as illustrated by the following examples.

EXAMPLE 1

A 100 g sample of soil containing 18 ppm of chromium (VI) at the pH 8.1 is treated with 100 ml 0.05% solution of high molecular weight anionic polyacrylamide Superfloc® 1820A (anionic polyacrylamide copolymer in water-in-oil emulsion having 30% of negative charged groups and molecular mass of 15 million made by Cytec Industries, Inc.) during 0.5 hour mixing. Elutriate is drained off, sulfuric acid is added to bring the pH to 2.5, sodium metabisulfite is added to convert Cr(VI) to Cr(II), the lime slurry is added to bring the pH to 9.0 and to form insoluble chromium(III) hydroxide which is precipitated. Both sludges (treated soil and hydroxide precipitant) as well as filtrate do not contain Cr(VI). Hence, for slightly chromium contaminated soil single-stage treatment using anionic synthetic organic flocculant solution and the valency reducing agent (sodium metabisulfite) is quite sufficient.

EXAMPLE 2

A 100 g sample of soil containing 700 ppm of chromium (VI) at pH 12.0 is treated with 2 subsequent washes using an admixture of 100 ml 0.05% solutions of Superfloc® 1820A and sulfuric acid to bring the pH to 6.5 during 0.5 hour mixing for each wash. After the first wash chromium (VI) content in the soil is 120 ppm. After the second wash, chromium content in the soil is 7 ppm. The first elutriate contains 80 ppm chromium (VI). The final elutriate contains 30 ppm chromium (VI). Both elutriates are combined and treated as described in Example 1, that is, sulfuric acid, sodium metabisulfite, and lime are added. Hence, for moderately chromium contaminated soil, two-stage treatment using anionic synthetic organic flocculant solution and the valency reducing agent ensures sufficient clean-up.

EXAMPLE 3

A 100 g sample of soil containing 3747 ppm of chromium (VI) at pH 12.8 is treated with 3 subsequent washes using an admixture of 100 ml 0.05% solutions of Superfloc® 1820A and sulfuric acid to bring the pH to 6.5 during 0.5 hour mixing for each wash. Chromium (VI) content in the soil is as follows:

after the first wash—2340 ppm;
after the second wash—1844 ppm;
after the third wash—1642 ppm.

Thus, for substantially higher concentration of chromium, soil treatment is provided by washing with a chromium reducing agent proceeds as follows.

A 100 g sample of soil containing 3747 ppm of chromium (VI) at pH 12.8 is treated with wash using an admixture of 100 ml 0.05% solutions of Superfloc® 1820A and sulfuric acid to lower the pH to 12.0 during 1 hour mixing. Then elutriate is drained off, sulfuric acid is added to bring the pH to 2.5, sodium metabisulfite is added to convert, Cr(VI) to Cr(III), the lime slurry is added to bring the pH to 9.0 and to form insoluble chromium(III) hydroxide which is precipitated and filtered. The chromium hydroxide sludge is combined with the final soil sludge. The soil sludge is treated with sulfuric acid to bring the pH to 2.5, sodium metabisulfite is added to reduce Cr(VI) to Cr(III). Then 0.05% solution of cationic Superfloc® 577C flocculant (polyquaternary amine in water solution having 100% positive charged groups and molecular mass of 75 thousand) is added to solid phase during 0.5 hour mixing. The second stage sludge is dewatered, treated with lime for chromium (III) immobilization. The second stage filtrate is combined with the first stage elutriate, treated as described in Example 1 and recycled for the first stage treatment. The final sludge has 33 ppm Cr(VI) and the second stage elutriate has 7 ppm Cr(VI). Hence, the technique employs the combination of treatment with synthetic organic anionic and cationic flocculants, and electron donor agent is employed to reduce chromium (VI) content in heavy contaminated soil up to 99.11%.

The forgoing Examples can be modified and made applicable for treating soil contaminated by other heavy metals such as lead or lead contaminated solid waste by using single- or two-stage washing by diluted anionic polymer solution followed by optional addition of lime for lead immobilization. Similar adaptation can made with cadmium contaminated solid waste.

We claim:

1. A method for treating soil contaminated with about 100 to about 1000 ppm of heavy metal comprising:

washing a sludge of said contaminated soil at pH 9–12 with a solution of anionic synthetic organic flocculant, separating the liquid and solid phases of the washed soil sludge, washing the solid separated soil sludge again with said solution of anionic synthetic flocculant at pH 9–12 one to two additional times, combining the separated liquid phase from each washing, treating the combined liquid phases with an alkaline reagent to precipitate heavy metal oxide, hydrated oxide, hydroxide or mixtures thereof, recycling the liquid phase remaining from the washing of said soil sludge, which remaining liquid phase has reduced heavy metal concentration, and dewatering the separated solid soil sludge.

2. The method claimed in claim 1 wherein said alkaline reagent is selected from the group consisting of lime, potassium hydroxide and sodium hydroxide.

3. The method claimed in claim 1 wherein said heavy metal is selected from at least one of the group consisting of antimony, bismuth, cadmium, chromium, copper, iron, lead, manganese, nickel, tin and zinc.

4. The method claimed in claim 3 wherein said heavy metal is chromium and the combined liquid phases from each washing is treated with a metal valency reducing agent under acidic conditions.

5. The method claimed in claim 4 wherein said metal valency reduction agent is sodium metabisulfite.

6. The method claimed in claim 4 wherein said anionic organic flocculant is a polyacrylamide.

7. The method claimed in claim 4 wherein said anionic organic flocculant is a polyethylene oxide.

8. A method for treating soil contaminated with more than 1000 ppm of heavy metal comprising:

washing a sludge of said contaminated soil at pH 9–12 with a solution of anionic synthetic organic flocculant, separating the liquid and solid phases of the washed solid sludge, washing the solid separated soil sludge again with said solution of anionic synthetic flocculant at pH 9–12 at least two additional times, treating said washed soil sludge with a metal valency reducing agent, treating the resulting sludge with a cationic organic flocculant to separate remaining solid phase, combining the liquid phases from each washing, treating the combined liquid phases with an alkaline agent to precipitate heavy metal oxide, hydrated oxide, or hydroxide or mixtures thereof, separating said heavy metal oxide, hydrated oxide, hydroxide or mixtures thereof from liquid and its combination with the final soil sludge, and said final soil sludge is treated with lime for heavy metal immobilization.

9. The method claimed in claim 8 wherein said anionic organic flocculant is a polyacrylamide and said cationic organic flocculant is a polyquaternary amine.

10. The method claimed in claim 8 wherein said alkaline reagent is selected for the group consisting of lime, potassium hydroxide and sodium hydroxide.

11. The method claimed in claim 8 wherein said heavy metal is selected from at least one of the group consisting of antimony, bismuth, cadmium, chromium, copper, iron, lead, manganese, nickel, tin and zinc.

12. The method claimed in claim 11 wherein said heavy metal is chromium and the combined liquid phases from each washing is treated with a metal valency reducing agent under acidic conditions.

13. The method claimed in claim 8 wherein said valency reduction agent is sodium metabisulfite.

14. The method claimed in claim 8 wherein said anionic organic flocculant is a polyacrylamide.

15. The method claimed in cliam 8 wherein said anionic organic flocculant is a polyethylene oxide.

* * * * *